Figure 1:
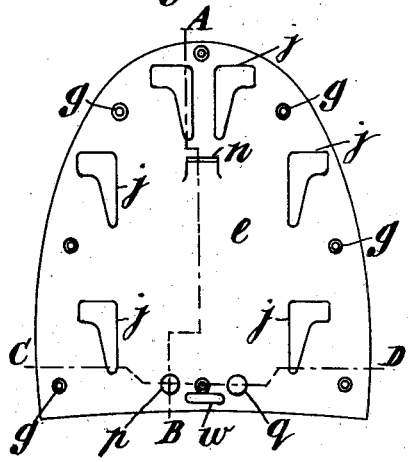

No. 826,031. PATENTED JULY 17, 1906.
P. Y. HARRISON & R. H. SOUTHALL.
DETACHABLE TOP PIECE FOR THE HEELS OF BOOTS AND SHOES.
APPLICATION FILED SEPT. 20, 1905.

3 SHEETS—SHEET 1.

Witnesses:
William Sadler
Annie Park.

Inventors.
Percy Yates Harrison
Robert Heap Southall
by
H. Fairburn Hart
Attorney.

No. 826,031. PATENTED JULY 17, 1906.
P. Y. HARRISON & R. H. SOUTHALL.
DETACHABLE TOP PIECE FOR THE HEELS OF BOOTS AND SHOES.
APPLICATION FILED SEPT. 20, 1905.
3 SHEETS—SHEET 2.
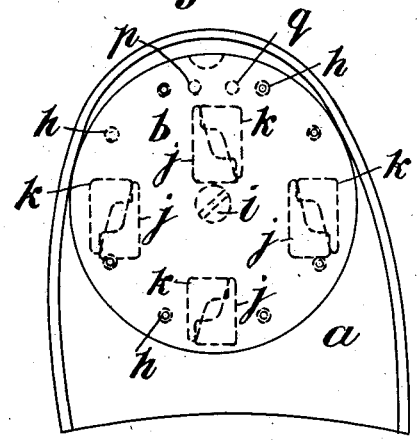
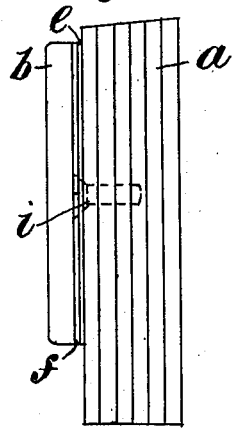
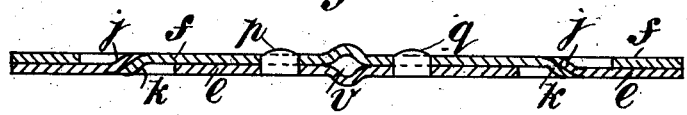
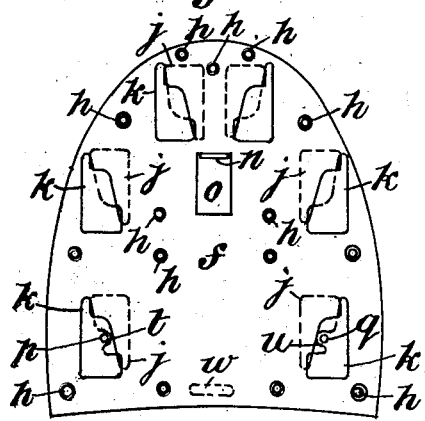
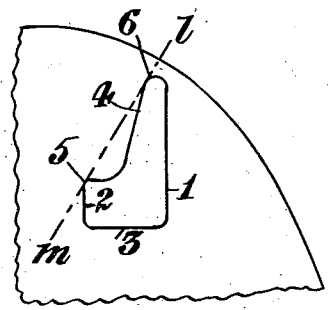

No. 826,031. PATENTED JULY 17, 1906.
P. Y. HARRISON & R. H. SOUTHALL.
DETACHABLE TOP PIECE FOR THE HEELS OF BOOTS AND SHOES.
APPLICATION FILED SEPT. 20, 1905.
3 SHEETS—SHEET 3.
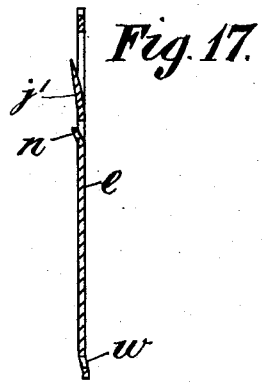
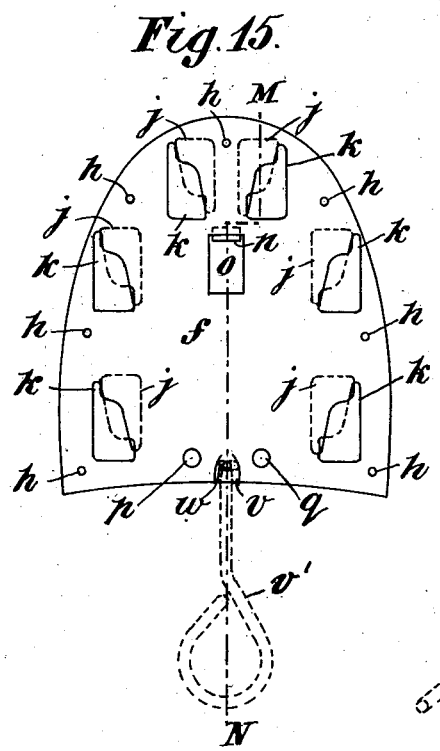
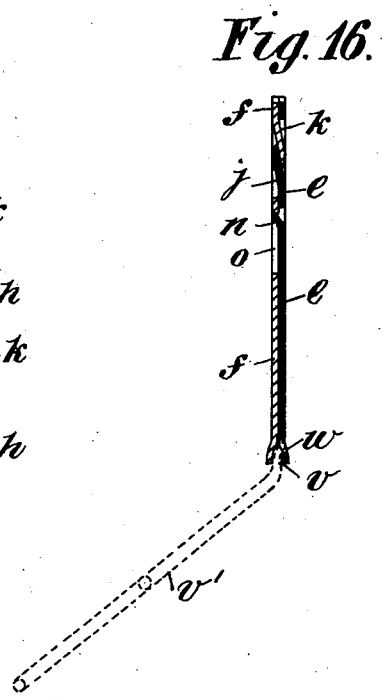

UNITED STATES PATENT OFFICE.

PERCY YATES HARRISON, OF BRADFORD, AND ROBERT HEAP SOUTHALL, OF LEEDS, ENGLAND.

DETACHABLE TOP PIECE FOR THE HEELS OF BOOTS AND SHOES.

No. 826,031.      Specification of Letters Patent.      Patented July 17, 1906.

Application filed September 20, 1905. Serial No. 279,292.

*To all whom it may concern:*

Be it known that we, PERCY YATES HARRISON, residing at 88 Beamsley road, Frizinghall, Bradford, and ROBERT HEAP SOUTHALL, residing at 19 Hamilton Terrace, Leeds, in the county of York, England, subjects of the King of Great Britain and Ireland, have invented new and useful Improvements in or Relating to Detachable Top Pieces for the Heels of Boots and Shoes, of which the following is a specification.

This invention relates to improvements in the attaching parts by which detachable top pieces or lifts for the heels of boots and shoes are held in position.

The object of this invention is to provide means for securely attaching and readily detaching the top lift to and from the main or major portion of the heel of a boot or shoe, both of which are hereinafter termed and included in the term "boot," and also for facilitating the repairing of the said heel by the wearer or by a boot-repairer without the removal of any screws. The said means consist of two flat metal plates of exactly the same size and of corresponding shapes provided with a number of interlocking triangular or equivalent projections, to be hereinafter particularly described, with or without additional stops, adapted to hold them together. The said projections are always so cut, shaped, and formed that when the two plates are locked together the projections of either of them shall lie within the thickness of the other plate. The plates are shaped when a fixed—that is, a non-revoluble—top piece is required of the same contour as that of the heel; but when a revolving heel is required—that is, a top piece that will automatically revolve on the stationary main portion of the heel—then they are made circular. The plates are when a fixed top piece is used attached to their respective parts by a number of nails or screws or spikes; but in the case of a revolving heel the plate that is attached to the main portion of the heel is retained in position by, say, a central screw, and the wearing-surface of the top lift is attached to its plates by a number of nails or screws or spikes in the same way as for the fixed top piece. The wearing-surface of the top piece, hereinafter termed the "tread-surface," is formed of one or more layers of leather, or gutta-percha, or india-rubber, or a combination of two or more of them. Each layer is composed of one or more pieces of the said material or materials, and when required, but not necessarily so, a metal or other wearing-surface may be fixed on or to the outer layer of the tread-surface. The tread-surface after being fixed to the plate is pared to the contour of the latter, which is made to act as a templet for the same.

By the use of the hereinbefore-mentioned plates no recesses are required to be made in either of the portions of the heel. The plates automatically secure themselves in position and cannot be separated without the use of a tool or small lever. The upper plates may be made interchangeable, so that they can be worn upon either heel at pleasure and attached or detached without necessitating the removal of any screw. The plates may also be sold separately in pairs to boot-repairers and others.

In the drawings hereunto annexed the method of carrying the invention into practice is shown.

Figure 2:
Figure 4:
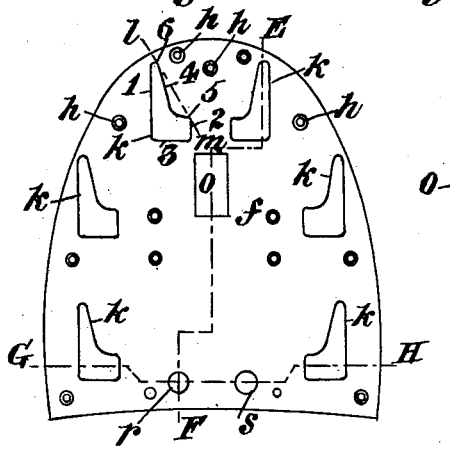
Figure 5:
Figure 3:
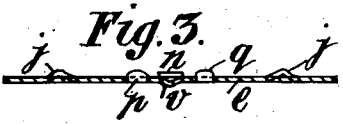
Figure 6:
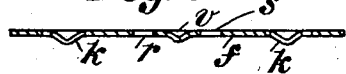
Figure 7:
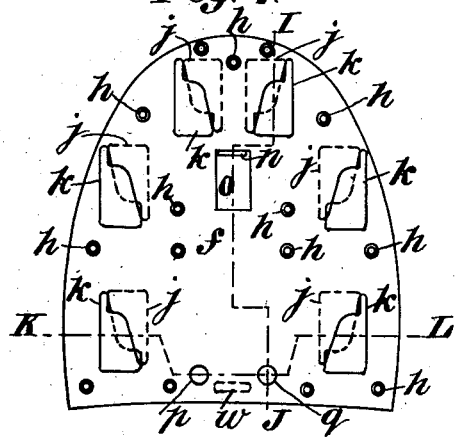
Figure 8:
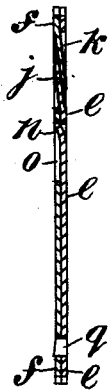
Figure 9:
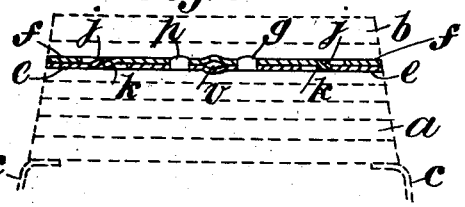

Figure 1 is a plan of a plate suitable for fixing to the main portion of the heel with a slightly-modified form of triangularly-shaped interlocking devices; Fig. 2, a longitudinal section on dotted line A B, Fig. 1; Fig. 3, a transverse section on dotted line C D, Fig. 1; Fig. 4, a plan of a plate suitable for fixing to the detachable top piece with interlocking devices adapted to mesh with the plate shown at Fig. 1; Fig. 5, a longitudinal section on dotted line E F, Fig. 4; Fig. 6, a transverse section on dotted line G H, Fig. 4; Fig. 7, a plan of the two plates shown at Figs. 1 and 4 with the interlocking parts meshed together; Fig. 8, a longitudinal section on dotted line I J, Fig. 7; Fig. 9, a transverse section on dotted line K L, Fig. 7, with main portion of the heel and its detachable top piece shown in dotted lines; Fig. 10, an enlarged transverse section on dotted line M N, Fig. 7; Fig. 11, a side elevation of heel with a revolving top piece applied; Fig. 12, a plan of same; Fig. 13, a plan showing a further modified form of interlocking device; Fig. 14, an enlarged plan of triangularly-shaped interlocking device; Fig. 15, an enlarged plan of two plates interlocked together with detaching-tool inserted; Fig. 16, a sectional elevation of the same on line M N, Fig. 15; Fig. 17, an enlarged elevation of a heel-plate with chamfered interlocking projections.

Like parts in all the views are marked with similar letters of reference.

$a$ is the main portion of the heel—that is, its major portion without a top layer or lift—$b$ the detachable top piece, and $c$ portions of the lasted boot-upper. The main portion $a$ and the detachable top piece $b$ are each formed of one or more layers or lifts of any suitable material—such as, for example, say, of leather, or india-rubber, or wood or metal with or without an outer covering of leather, or a combination of two or more of them—that is to say, the main portion $a$ may be formed or made wholly of wood covered with leather, as is frequently the case in ladies' boots, provided with Louis or Würtemberg or other high and underset heels or of one or more layers or lifts of leather or india-rubber or a combination of them. When the main portion is made in layers or lifts, as shown in the drawings, they may be cut, arranged, and attached to the lasted boot-upper in the ordinary way and by the usual means. The top piece $b$ is formed of a number—say one or two, as shown in the drawings, or more—of layers or lifts of leather, or india-rubber, or gutta-percha, or wood, or a combination of two or more of them. Each layer or lift may be formed of one or more pieces. When more than one piece is used in a layer, the several pieces should be fairly accurately fitted together. The last-named method enables what has hitherto been waste pieces of sole-leather to be used for the wearing-tread of the heel. This also facilitates the removal of old and worn material and enables it to be replaced with new material. When required, but not necessarily so, a metal or other wearing-tip of any suitable or ordinary construction may be applied to and combined with the top piece $b$.

$e\ f$ are two plates of exactly the same size, and they are made of any suitable metal—such as, say, light sheet-steel of, say, about twenty-four wire gagé, provided with interlocking devices, to be presently described. The said two plates are respectively fixed to the main portion $a$ and the detachable top piece $b$ for attaching them together. The shape of the plate is determined by the character of the top piece $b$, whether it is to be a fixed or revolving one. If a fixed top piece is required, then the plates are shaped as shown, for example, say, at Figs. 1, 4, 7, and 13, to the contour of the heel, and they are made to entirely cover its flat surface; but when the top piece is required to be capable of automatically revolving then the plates are made circular, as shown at Figs. 11 and 12, and they do not entirely cover the flat surface of the heel. In the case of heels with fixed top pieces the plates are secured, respectively, to the flat surface of the main portion $a$ and detachable top piece by nails or screws arranged to pass through the countersunk holes $g\ h$ or by spikes formed on one of the surfaces of each plate; but in the case of heels with revolving top pieces the plate $e$ is secured to the main portion $a$ by a central screw $i$, the plate $e$ being countersunk to receive the head of the screw, while the plate $f$ is secured to its top piece by nails or screws passing through countersunk holes $h$ or by spikes arranged upon one of its surfaces.

The plates $e$ and $f$ are made in dies of ordinary construction, and the interlocking parts, stops, and projections may be pressed or formed out of the main portion of each plate. The plates, if required, but not necessarily so, are afterward tempered by any ordinary means. The plates are made flat, with the interlocking projecting portions of the parts of one plate arranged to be inclosed within the thickness of the second plate, so as to avoid having to form a recess for their reception in either the main portion $a$ or the detachable top piece $b$.

The interlocking device for securing the two plates $e\ f$ together consists of forming a number of triangular or equivalent shaped projections $j\ k$, respectively, out of the said two plates. The projections $j\ k$ are respectively turned up or bent down to the required shape to serve as fingers or hooks, and they are made to mesh together. The projections $j\ k$ are made triangular-shaped, as shown, so that the incline-faces when they come into contact with one another may tend to draw together and tighten the one upon the other, thus obtaining a very secure hold. Moreover, the inclined faces of the engaging parts of that plate which is fixed to the main portion $a$ of the heel are disposed on that side of the finger or hook which is turned away from the center line of the plate, whereas in the plate attached to the detachable top piece $b$ the inclined faces of the fingers or hooks are disposed on the sides which are turned toward the center line. Thus the draw of the engaging parts tends to compress the plate which is attached to the main part $a$ of the heel and to expand the plate which is attached to the detachable top piece $b$. As the main part $a$ of the heel is practically incompressible, while the detachable part $b$ has a certain elasticity, the effect of this drawing action is to flatten the top piece upon the heel and so to secure close contact of the two engaging plates over their whole surfaces. It will be seen that the apex of the triangle plays only a subordinate part in the operation of this appliance and that other forms, not strictly speaking, "triangular" may be used for the hooks or fingers, respectively, provided they afford inclined meeting faces upon the engaging parts to operate as herein described and shown.

Each of the projections $j\ k$ is formed by removing a portion of each plate, whereby a kind of triangular-shaped hole or slot is provided. The sides or boundaries of these holes or slots consist of two longitudinal parts 1 2, Fig. 4, of different lengths, and a transverse part 3, which unites the two together. The two longitudinal parts 1 2 are also united together by an inclined lip, curved as shown in Figs. 4 and 14, which overhangs the dotted line $l\ m$ and is turned slightly upward for plate $e$ and slightly downward for plate $f$ to form hook or finger projections $j\ k$. The dotted line $l\ m$, already referred to, inclines at or about an angle of from forty-five to sixty degrees to the longitudinal center line of the plate. The projections $j'$, Fig. 17, may be slightly chamfered (but not necessarily so) on their under surfaces and the projections $k$ on their upper surfaces to enable them to more readily mesh together. A convenient method of setting out the said slots and projections is in the form of a rectangle—say, for example, but not necessarily so, nine-sixteenths by three-sixteenths of an inch. This will permit of the lengths of parts 1 2 being respectively nine-sixteenths and three-sixteenths of an inch and the part 3, as shown, say, five-sixteenths. If a line be drawn, as shown in dots at $l\ m$, Fig. 4, between the points 5 6 and the curves put in when the projections $j\ k$ are turned, respectively, up and down, it will be found that inclines are formed at the required angles that will securely draw and hold the two plates together when in use. When the projections $j\ k$ are meshed together, as the portions of the respective inclines work upon the part 2 of each slot they draw the plates securely together.

The number of projections $j\ k$ may be varied; but for general purposes six, as shown at Figs. 1 and 7, or four, as shown at Fig. 12, will be found to be sufficient. It will be seen on reference to the drawings that the recesses and interlocking projections may be advantageously arranged in and on each plate in pairs and on opposite sides of its longitudinal center with their inclines also arranged in opposite directions—that is, to incline away from the longitudinal center to the perimeter of the plate on each side of said center.

A projection $n$ or flat spring with a horizontal face is formed out of the main portion of the plate $e$ at a suitable distance from, say, its rear, and it is made to engage with a slot $o$ in the plate $f$. One or more—say two—pins $p\ q$ or projections of the same thickness as the plate $f$ are provided when required at or near the breast of the plate $e$ and adapted to enter holes $r\ s$, formed for their reception in the plate $f$. The pins $p\ q$ are also inclined at the rear to enable the plates to more readily mesh together. The pins $p\ q$ and projection $n$ form stops for preventing any rearwardly longitudinal movement of the plates $e\ f$ when they are meshed together. The projections $j\ k$ prevent any lateral movement of the plates.

In some cases, as shown at Fig. 13, the pins $p\ q$ are arranged wide apart, and when this is done they may be made to enter recesses $t\ u$, formed for their reception in projections $k$ of plate $f$. The two plates $e\ f$ are also slightly curved to form an opening $v$ for the insertion of a flat-pointed separating-tool (shown in dotted lines at $v'$, Figs. 15 and 16, in order that it may be readily distinguished from the essential features of the invention) for raising the plates clear of the pins $p\ q$ and forcing them backward until the projections $j\ k$ are clear of each other. The point of the separating-tool is made to enter the elongated hole $w$ in the plate $e$ or to bear against a ridge thereon to obtain a leverage for raising the plate $f$ sufficiently high to clear the pins $p\ q$ and for pressing the latter plate and the tread-surface in a rearwardly direction.

The use of this invention enables what are usually waste pieces of material to be utilized, inasmuch as the removable plate can be surfaced with small pieces of leather placed, say, side by side. Further, if, say, in the case of fixed heels one portion of the tread-surface becomes worn it can be readily removed and replaced with new material without displacing the other portion or portions. To enable this to be accomplished, the plate $f$ has its holes $h$ arranged in rows, as shown at Figs. 4, 7, and 13.

On reference to Figs. 11 and 12 it will be seen that with the exception of the plates being circular instead of externally somewhat resembling a horseshoe, as at Figs. 1 and 4, they are identically the same as regards interlocking devices, pins, or projections, and stops. Four interlocking devices are shown, slightly differently arranged as regards position on the plates, but still in pairs and on opposite sides of the center. The means required for securing the top piece or lift to its heel and also the first-named plate to the main portion of the heel may be varied according to the material of which such parts are made. If so desired, the surfaces of such plates which come in contact with the said parts when so required may be provided with projections or tongues formed out of the plates or attached thereto for causing them more readily to be secured to the said plates.

The action of the plates is as follows: The plate $e$ having been fixed or revolubly attached to the flat surface of the main portion $a$ of the heel and the plate $f$ fixed to the under side of the detachable heel-piece and the layers of the latter pared to the shape of the plate, the two plates are then placed one upon the other, with the projections $j\ k$ in a position to interlock with each other. As the plate $f$ is pressed longitudinally forward toward the breast of the heel the inclines formed by turning the said projections respectively upward and downward are made to work against the longitudinal parts 2 of each slotted portion of the plates. The said longitudinal sliding action thus draws the plates laterally outward, thereby forcing the projections $k$ under the projections $j$. When the breast of plate $f$ has passed over the pins $p\ q$, the horizontal face of the projection $n$ will have come into contact with the horizontal portion of the slot $o$ in plate $f$, thus providing means for preventing the plates sliding in a rearwardly longitudinal direction when in use. The natural spring of the plates prevents them from working free of the pins $p\ q$ and holes $r\ s$ until released by the insertion of a separating-tool at $v$, as previously described. When the tread-surface becomes worn on the two plates being separated, the old material can be readily removed from the plate and replaced with new material.

Plates constructed according to this invention and as herein described may be stamped out of a sheet of thin metal without joint or seam, and they are designed to obviate any countersinking or recessing of the parts of the heel to which they are applied. They are also made to be interchangeable, thus adding considerably to the life of the tread-surface of the detachable portion of fixed heels. When their tread-surfaces become worn at one part, they may be changed onto the heel of the other boot, thereby presenting a new wearing-surface. Further, little or no skill is required to remove an old and worn tread-surface from the plate $f$ and refix a new one without necessarily taking them to a boot-repairer.

We are aware that prior to our invention the heels have been attached to the soles and detachable top pieces have been attached to the main portion of boot and shoe heels by means of two plates arranged to mesh and to interlock together by means of hooks and loops or longitudinal projections; but to such we make no claim, except when constructed substantially as herein described and illustrated; but What we do claim as our invention, and desire to secure by Letters Patent, is—

1. The combination of a plate having slots and triangular inclined projections cut and formed thereon and arranged in pairs at opposite portions of the plate, of a second similarly-shaped plate having correspondingly-shaped slots and projections adapted to mesh with the slots and projections of the first plate for holding the plates together, said slots and projections being capable of interlocking within the thickness of the two plates, a horizontally-faced projection formed on one plate adapted to fit into a recess formed on the second plate for preventing any longitudinal movement of the said plates when their projections are interlocked together, and means consisting of pins in one plate and holes in the other plate for preventing the displacement of the plates relatively to one another when in use.

2. The combination with a boot-heel permanently connected to the boot, of two plates of the same size and contour adapted to slide one upon the other, each of the plates being provided with slots and triangular inclined projections arranged in pairs at opposite portions of each plate, said slots and projections being capable of interlocking within the thickness of the two plates with each other for holding the plates together, one of the said plates being also provided at or near its rear with a horizontally-faced projection and with means consisting of pins at or near its breast, said projection and pins being adapted to engage with holes formed for their reception in the second plate for preventing the displacement of the plates relatively to one another when in use, all constructed and arranged substantially as herein described and as illustrated in the accompanying drawings.

In testimony whereof we have signed our names to this specification in the presence of two subscribing witnesses.

PERCY YATES HARRISON.
ROBERT HEAP SOUTHALL.

Witnesses:
WILLIAM SADLER,
ANNIE PARK.